(12) United States Patent
Smalley

(10) Patent No.: US 12,210,318 B2
(45) Date of Patent: *Jan. 28, 2025

(54) TILEABLE, COPLANAR, FLAT-PANEL 3-D DISPLAY WITH TACTILE AND AUDIO INTERFACES

(71) Applicant: Light Field Lab, Inc., San Jose, CA (US)

(72) Inventor: Daniel Smalley, Provo, UT (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,815

(22) Filed: Apr. 20, 2022

(65) Prior Publication Data

US 2022/0373969 A1 Nov. 24, 2022

Related U.S. Application Data

(63) Continuation of application No. 16/816,877, filed on Mar. 12, 2020, now Pat. No. 11,327,437, which is a
(Continued)

(51) Int. Cl.
*G03H 1/00* (2006.01)
*G02B 30/27* (2020.01)
(Continued)

(52) U.S. Cl.
CPC ........... *G03H 1/0005* (2013.01); *G02B 30/27* (2020.01); *G03H 1/2294* (2013.01); *G06F 3/016* (2013.01);
(Continued)

(58) Field of Classification Search
CPC .. G03H 1/0005; G03H 1/2294; H04N 13/305; H04N 13/302; G02B 30/21
See application file for complete search history.

(56) References Cited

U.S. PATENT DOCUMENTS 5,465,308 A 11/1995 Hutcheson et al.
5,822,125 A 10/1998 Meyers
(Continued)

FOREIGN PATENT DOCUMENTS

CN 1046998 A 11/1990
CN 1973226 A 5/2007
(Continued)

OTHER PUBLICATIONS

CN201980018334.2 First Office Action of the Chinese Patent Office mailed Sep. 13, 2022.
(Continued)

*Primary Examiner* — Rowina J Cattungal

(57) ABSTRACT

A method and system for a scalable multi-sense user experience are disclosed. A three-dimensional ("3-D") display is disposed behind a slit plane comprising slits and ultrasonic transducers. Light from the 3-D display passes through the slits in the slit plane to generate a 3-D image. The ultrasonic transducers on the front of the slit plane, i.e., opposite the side where the 3-D display is disposed, generate directed acoustic field and/or a formed tactile field. Because the generating components for all three senses, i.e., visual, audio, and tactile, are coplanar, units may be tiled and thereby scaled to generate larger multi-sense experiences.

20 Claims, 9 Drawing Sheets

Related U.S. Application Data continuation of application No. 15/077,839, filed on Mar. 22, 2016, now Pat. No. 10,591,869.

(60) Provisional application No. 62/137,325, filed on Mar. 24, 2015.

(51) Int. Cl.
    *G03H 1/22*     (2006.01)
    *G06F 3/01*     (2006.01)
    *H04N 13/302*   (2018.01)
    *H04N 13/305*   (2018.01)

(52) U.S. Cl.
    CPC ......... *H04N 13/302* (2018.05); *H04N 13/305* (2018.05); *G03H 2001/221* (2013.01)

(56) References Cited

U.S. PATENT DOCUMENTS

| | | | |
|---|---|---|---|
| 5,949,581 A | 9/1999 | Kurtenbach et al. | |
| 5,974,215 A | 10/1999 | Bilbro et al. | |
| 6,013,072 A | 1/2000 | Winston et al. | |
| 7,016,516 B2 | 3/2006 | Rhoads | |
| 7,054,850 B2 | 5/2006 | Matsugu | |
| RE39,864 E | 10/2007 | Athale et al. | |
| 8,149,265 B2 | 4/2012 | Smalley et al. | |
| 8,369,546 B2* | 2/2013 | Pompei | B82Y 30/00 381/116 |
| 8,619,177 B2 | 12/2013 | Perwass et al. | |
| 9,063,289 B1 | 6/2015 | Farmer et al. | |
| 9,411,511 B1* | 8/2016 | Sivertsen | G06F 3/04815 |
| 9,958,829 B2 | 5/2018 | Aravkin et al. | |
| 10,094,974 B2 | 10/2018 | Chen et al. | |
| 10,432,919 B2 | 10/2019 | Lapstun | |
| 10,560,689 B2 | 2/2020 | Lapstun | |
| 2001/0002865 A1 | 6/2001 | Lipponen et al. | |
| 2001/0028356 A1 | 10/2001 | Balogh | |
| 2003/0137730 A1 | 7/2003 | Fridman et al. | |
| 2005/0119575 A1 | 6/2005 | Adabaum et al. | |
| 2006/0028400 A1 | 2/2006 | Lapstun et al. | |
| 2006/0241572 A1 | 10/2006 | Zhou | |
| 2006/0256415 A1 | 11/2006 | Holmes et al. | |
| 2007/0091638 A1 | 4/2007 | Ijzerman et al. | |
| 2008/0035834 A1 | 2/2008 | Gleckler | |
| 2008/0144174 A1 | 6/2008 | Lucente et al. | |
| 2008/0170293 A1 | 7/2008 | Lucente et al. | |
| 2009/0040294 A1 | 2/2009 | Smalley et al. | |
| 2009/0235750 A1 | 9/2009 | Chang et al. | |
| 2009/0273575 A1 | 11/2009 | Pryor | |
| 2009/0314929 A1 | 12/2009 | Lee et al. | |
| 2010/0245824 A1* | 9/2010 | Schwarz | H04N 13/31 356/400 |
| 2011/0012895 A1 | 1/2011 | Lucente et al. | |
| 2011/0114831 A1 | 5/2011 | Grier | |
| 2012/0050833 A1 | 3/2012 | Bove, Jr. et al. | |
| 2012/0206390 A1 | 8/2012 | Ueno et al. | |
| 2012/0313839 A1 | 12/2012 | Smithwick et al. | |
| 2013/0069933 A1 | 3/2013 | Smithwick et al. | |
| 2013/0082905 A1 | 4/2013 | Ranieri et al. | |
| 2013/0208082 A1 | 8/2013 | Williams et al. | |
| 2014/0035959 A1 | 2/2014 | Lapstun | |
| 2014/0043370 A1 | 2/2014 | Payne et al. | |
| 2014/0072141 A1* | 3/2014 | Cohen | H04R 1/04 381/91 |
| 2014/0253613 A1* | 9/2014 | Gilbert | G06F 3/0412 345/697 |
| 2014/0293385 A1 | 10/2014 | Smithwick | |
| 2014/0300694 A1 | 10/2014 | Smalley et al. | |
| 2014/0300695 A1 | 10/2014 | Smalley et al. | |
| 2014/0307179 A1 | 10/2014 | Zhao et al. | |
| 2015/0016777 A1* | 1/2015 | Abovitz | G02B 27/0093 385/37 |
| 2015/0022754 A1* | 1/2015 | Jepsen | G02F 1/133504 349/61 |
| 2015/0185841 A1 | 7/2015 | Levesque et al. | |
| 2015/0192995 A1* | 7/2015 | Subramanian | G06F 3/011 340/407.1 |
| 2015/0201186 A1 | 7/2015 | Smithwick | |
| 2015/0241608 A1 | 8/2015 | Shian et al. | |
| 2015/0277378 A1 | 10/2015 | Smithwick et al. | |
| 2016/0014529 A1 | 1/2016 | Hecht et al. | |
| 2016/0026253 A1 | 1/2016 | Bradski et al. | |
| 2016/0139402 A1 | 5/2016 | Lapstun | |
| 2016/0170372 A1 | 6/2016 | Smithwick | |
| 2016/0175701 A1 | 6/2016 | Froy et al. | |
| 2016/0179261 A1 | 6/2016 | Drumm | |
| 2016/0209657 A1 | 7/2016 | Popovich et al. | |
| 2016/0223988 A1 | 8/2016 | Bove et al. | |
| 2016/0274539 A1 | 9/2016 | Smithwick | |
| 2016/0277843 A1 | 9/2016 | Babayoff et al. | |
| 2016/0282808 A1 | 9/2016 | Smalley | |
| 2017/0209121 A1 | 7/2017 | Davis et al. | |
| 2017/0214907 A1 | 7/2017 | Lapstun | |
| 2017/0289530 A1 | 10/2017 | Smithwick et al. | |
| 2018/0063519 A1 | 3/2018 | Smithwick et al. | |
| 2018/0084245 A1 | 3/2018 | Lapstun | |
| 2019/0259320 A1 | 8/2019 | Lapstun | |

FOREIGN PATENT DOCUMENTS

| | | |
|---|---|---|
| CN | 101052910 A | 10/2007 |
| CN | 105378377 A | 3/2016 |
| CN | 106233227 A | 12/2016 |
| EP | 0973152 A2 | 1/2000 |
| JP | S59105800 A | 6/1984 |
| JP | S60030407 U | 3/1985 |
| JP | H06258532 A | 9/1994 |
| JP | H10191496 A | 7/1998 |
| JP | 2001313959 A | 11/2001 |
| JP | 2009530661 A | 8/2009 |
| JP | 2010156786 A | 7/2010 |
| JP | 2015143858 A | 8/2015 |
| KR | 101298848 B1 | 8/2013 |
| WO | 2008048360 A2 | 4/2008 |
| WO | 2008093721 A1 | 8/2008 |
| WO | 2016007920 A1 | 1/2016 |
| WO | 2017007526 A2 | 1/2017 |
| WO | 2017127897 A1 | 8/2017 |

OTHER PUBLICATIONS

"Plastics-Vocabulary", International Organization for Standardization, Switzerland 1999, ISO 472 2013.

EP-19738109.8 European Extended Search Report of European Patent Office dated Oct. 18, 2021.

Hoshi, et al., "Noncontact tactile display based on radiation pressure of airborne ultrasound." IEEE Transactions on Haptics, vol. 3, No. 3 (2010): pp. 155-165.

International Search Report and Written Opinion of PCT/US2016/023753 dated Jul. 15, 2016.

International Search Report and Written Opinion of PCT/US2019/013552 dated May 2, 2019.

Plesniak, Coincident Display Using Haptics and Holographic Video, Spatial Imaging Group, pp. 18-23 (Year: 1998).

Smith, T.E., "Notebook for Spatial Data Analysis, Part I, Spatial Point Pattern Analysis", (2016) ESE 502, (http://www.seas.upenn.edu/~ese502/#notebook).

Watanabe, et al., "A Method for controlling tactile sensation of surfaces roughness using ultrasonic vibration." Robotics and Automation, 1995 Proceedings., 1995 IEEE International Conference on vol. 1. IEEE, 1995.

JP2020-538941 Non-Final Notice of Reasons for Rejection from the Japan Patent Office mailed Dec. 6, 2022.

CN201980018334.2 Second Office Action of the Chinese Patent Office mailed May 10, 2023.

JP2020-538941 Final Notice of Reasons for Rejection of the Japan Patent Office dated May 30, 2023.

(56) References Cited

OTHER PUBLICATIONS

AU-2019206712 Examination Report No. 2 dated May 28, 2024.
EP-19738109.8 European Exam Report of European Patent Office dated Sep. 12, 2024.

* cited by examiner

TILEABLE, COPLANAR, FLAT-PANEL 3-D DISPLAY WITH TACTILE AND AUDIO INTERFACES

BACKGROUND OF THE INVENTION

Several different disciplines have been pushing the envelope for user experiences wherein a user is immersed in an environment with virtual sensations for vision, hearing, and touch. In the area of vision, current technology for 3-D displays continues to improve. Three-dimensional ("3-D") display technologies may include, but are not limited to, stereoscopic, autosterescopic, anaglyph, lenticular, lenslet, barrier line, coded aperture, micropolarizer, view sequential, volumetric (including free-space and swept volume displays), waveguide directional, panoramagram, frustrated total internal reflection, liquid lens, backlight steering/eye-tracked, coupled electro-optic, flying fiber, nanophotonic array, nanoantenna tuned laser, and holographic images. In the area of hearing, directed audio technology makes it so that a sound is audible in only a limited volume in space, while the sound may be completely inaudible in an adjacent volume in space. Other audio technologies include parametric speakers, "holosonic" audio, "hypersonic" audio, audio demodulation, nonlinear difference frequency generation and multi-wave mixing. In the area of touch, ultrasonic tactile fields is a rapidly developing technology by which specially placed sound energy, frequently generated by ultrasonic transducers, allows a person to feel the sound waves as virtual shapes in space even though the space is void of physical objects.

Current development of these technologies includes efforts to combine two of these three senses (i.e., visual, audio, and tactile) in the same experience, e.g., visual and tactile, or visual and audio. For example, combining visual and tactile sensations in the same experience could result in a person seeing an object represented as a 3-D hologram and being able to feel, via a tactile field, that object. Combining visual and audio sensations in the same experience could result in a person seeing an object represented as a 3-D hologram and hearing sounds that appear to originate from the object, and even from different parts of the object.

Several proposals for generating a multi-sense effect, i.e., combining visual, audio, and tactile, or a two-sense combination from these three senses, have been suggested, but suffer from significant shortcomings. In one approach, shown in FIG. 1, a planar device 110 for generating a 3-D display 150 from optical wavefront 160 is orthogonal relative to a plane 120 having ultrasonic transducers 130a ... n for generating a tactile field 150 from acoustic wavefront 170. Note that item 150 represents both a 3-D display and a tactile field.

Previous approaches have also relied on headphones for sound in conjunction with a 3-D display, but headphones are an encumbrance to the freedom of experiencing a 3-D field. Other previous approaches have suggested the use of parametric (directional) speakers located orthogonal relative to a 3-D display Although approaches involving ultrasonic transducers or parametric speakers orthogonally disposed relative to a 3-D display may suffice for applications requiring only one unit, i.e., one 3-D display plane with one plane having ultrasonic transducers or parametric speakers, such approaches are not scalable. For example, to generate a large 3-D display with directed sound and a tactile field, two options are available. The first, as shown in FIG. 2, is to generate a very large 3-D display 210 located orthogonally to an equally large plane 220 for ultrasonic transducers or parametric speakers 230a ... n. This first option has the undesirable side effect of requiring a large plane on which a user 240 may be required to stand to interact with the multi-sense experience 250, or may require taking up an entire wall for one of the orthogonal planar surfaces. In addition to the potential for damage resulting from user 240 standing on planar surface 220, the large distances from the furthest extents of 3-D display plane 210 to the furthest extents of plane 220 containing ultrasonic transducers or parametric speakers may make it difficult to present all sensations (sight and one or both of sound and tactile) at some locations.

A second option, as shown in FIG. 3, is to tile units 310a ... n, each comprising a 3-D display plane 311n and plane 312n with ultrasonic transducers or parametric speakers orthogonally disposed relative each other. This option is undesirable because orthogonally disposed planes 312a ... n protrude from the wall of tiled units 311a ... n, and also because protruding planes 312a ... 312n will interfere with the 3-D display functionality, tactile field, and directed audio functionality from other units. For example, light 360 from 3-D display plane 350 is blocked by orthogonally disposed plane 370.

What is needed is a tileable and scalable unit capable of generating a 3-D display with directed audio and/or a tactile field.

BRIEF SUMMARY OF THE INVENTION

This Application discloses a tileable and scalable unit capable of generating a 3-D display combined with directed audio and/or a tactile field.

In one embodiment, a slit plane is disposed over a 3-D display panel such that the slit plane and 3-D display panel are coplanar relative to each other. The slit plane may include slits through which light from the 3-D display passes so that the slit plane does not hinder, or at most minimally or marginally hinders, functionality of the 3-D display. The unused area on the slit plane between the slits may be occupied by ultrasonic transducers for generating a tactile field, directional audio, or both. The slit plane thus comprises slits and ultrasonic transducers.

In a preferred embodiment, the combined 3-D display, slit plane, and ultrasonic transducers, which may be referred to as a "combined panel" or "unit" are tileable, so that multiple "combined panels" can be placed adjacent to each other, i.e., "tiled," to create a larger conglomerate panel having the effect of one large tile. The tileable nature of the combined panel allows for constructing walls of tiled combined panels, or other arrangements as may be appropriate under particular circumstances, without the inconveniences and obstructions that result when the 3-D display and ultrasonic transducers are not coplanar.

DETAILED DESCRIPTION OF THE INVENTION

This application claims priority to U.S. Provisional Application No. 62/137,325 (Smalley; TILEABLE, COPLANAR, FLAT-PANEL HOLOGRAPHIC DISPLAY AND HAPTIC INTERFACE OR HOLODECK PANEL), filed Mar. 24, 2015.

This disclosure incorporates several documents by reference: U.S. Patent Publication 20090040294 (Smalley et al., HOLOGRAPHIC VIDEO DISPLAY SYSTEM); U.S. Patent Publication 20120050833 (Bove, Jr. et al., METHODS AND APPARATUS FOR HOLOGRAPHIC ANIMATION); U.S. Patent Publication 20140300694 (Smalley et al., ANISOTROPIC LEAKY-MODE MODULATOR FOR HOLOGRAPHIC VIDEO DISPLAYS); U.S. Patent Publication 20140300695 (Smalley et al., FULL-PARALLAX ACOUSTO-OPTIC/ELECTRO-OPTIC HOLOGRAPHIC VIDEO DISPLAY); and U.S. Pat. No. 8,149,265 (Smalley et al., HOLOGRAPHIC VIDEO DISPLAY SYSTEM).

In one embodiment, the invention disclosed herein is a tileable and scalable unit capable of generating a 3-D display, directed audio, and a tactile field.

Figure 5:
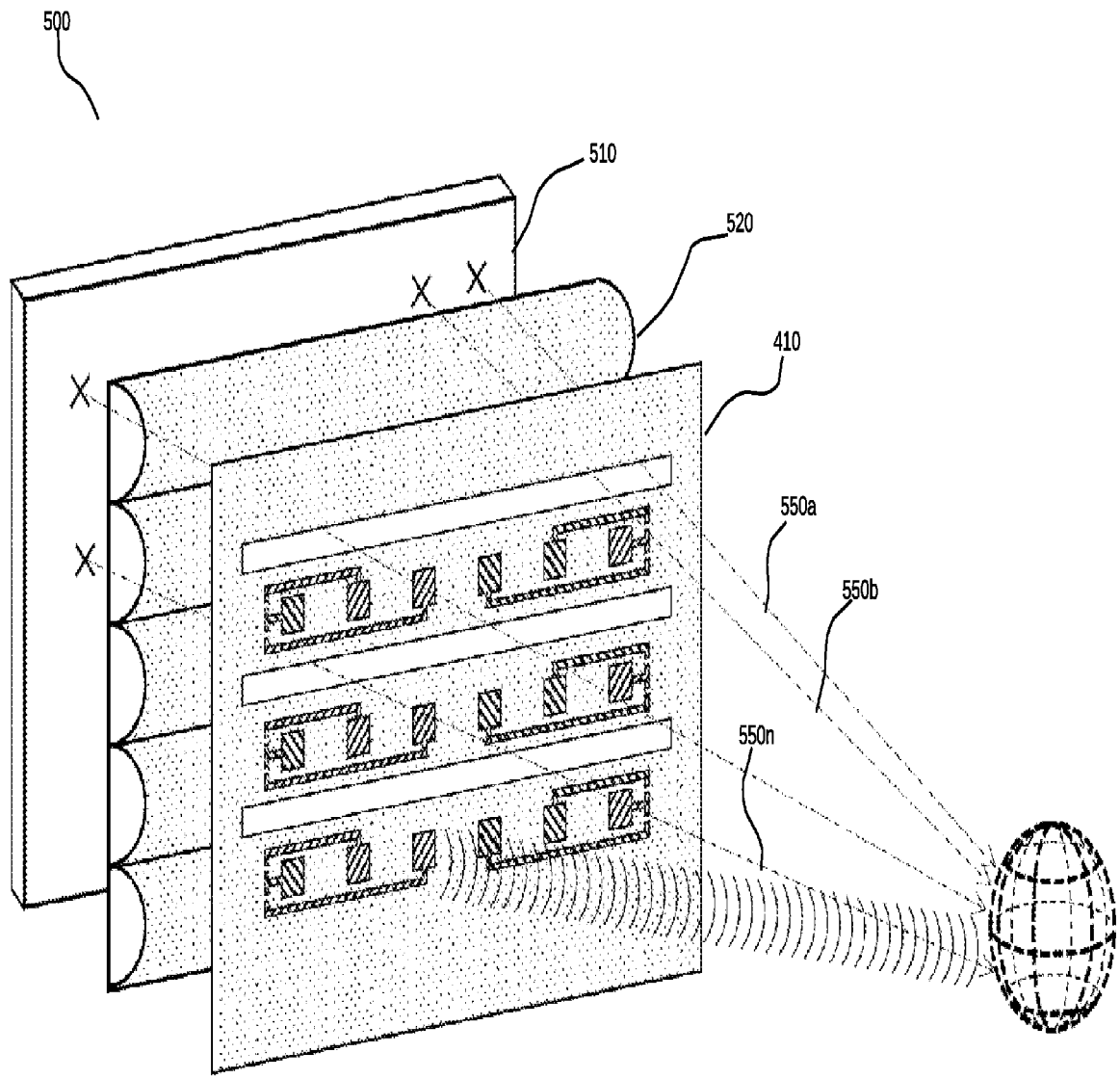
FIG. 5 illustrates an exemplary embodiment of this invention, comprising a slit plane and a 3-D display.

FIG. 5 illustrates a preferred embodiment of the disclosed invention, comprising at least 3-D display 510 and slit plane 530.

Multiple technologies and/or approaches may be used to construct or generate 3-D display 510. For example, several patent publications and issued patents disclose details for generating a 3-D display: U.S. Patent Publication 20090040294; U.S. Patent Publication 20120050833; U.S. Patent Publication 20140300694; U.S. Patent Publication 20140300695; and U.S. Pat. No. 8,149,265.

In a preferred embodiment, 3-D display 510 may be generated by a holographic display with light deflected by one or many surface acoustic wave patterns. Other 3-D display concepts may include, but are not limited to, lenticular, barrier line, LCD, MEMS, LCOS, ferroelectric, coded aperture, micropolarizer, view sequential, waveguide directional, panoramagram, frustrated total internal reflection, liquid lens, backlight steering/eye-tracked, coupled electro-optic, flying fiber, nanophotonic array, nanoantenna tuned laser, and holographic images.

3-D display 510 may be constructed as a display stack, i.e., as a set of stacks which each perform various functions for 3-D display 510. The stack layers of 3-D display 510 could include, for example, a monolithic flat-panel holographic video display, a spacer layer, and a lenticular array.

Figure 1:
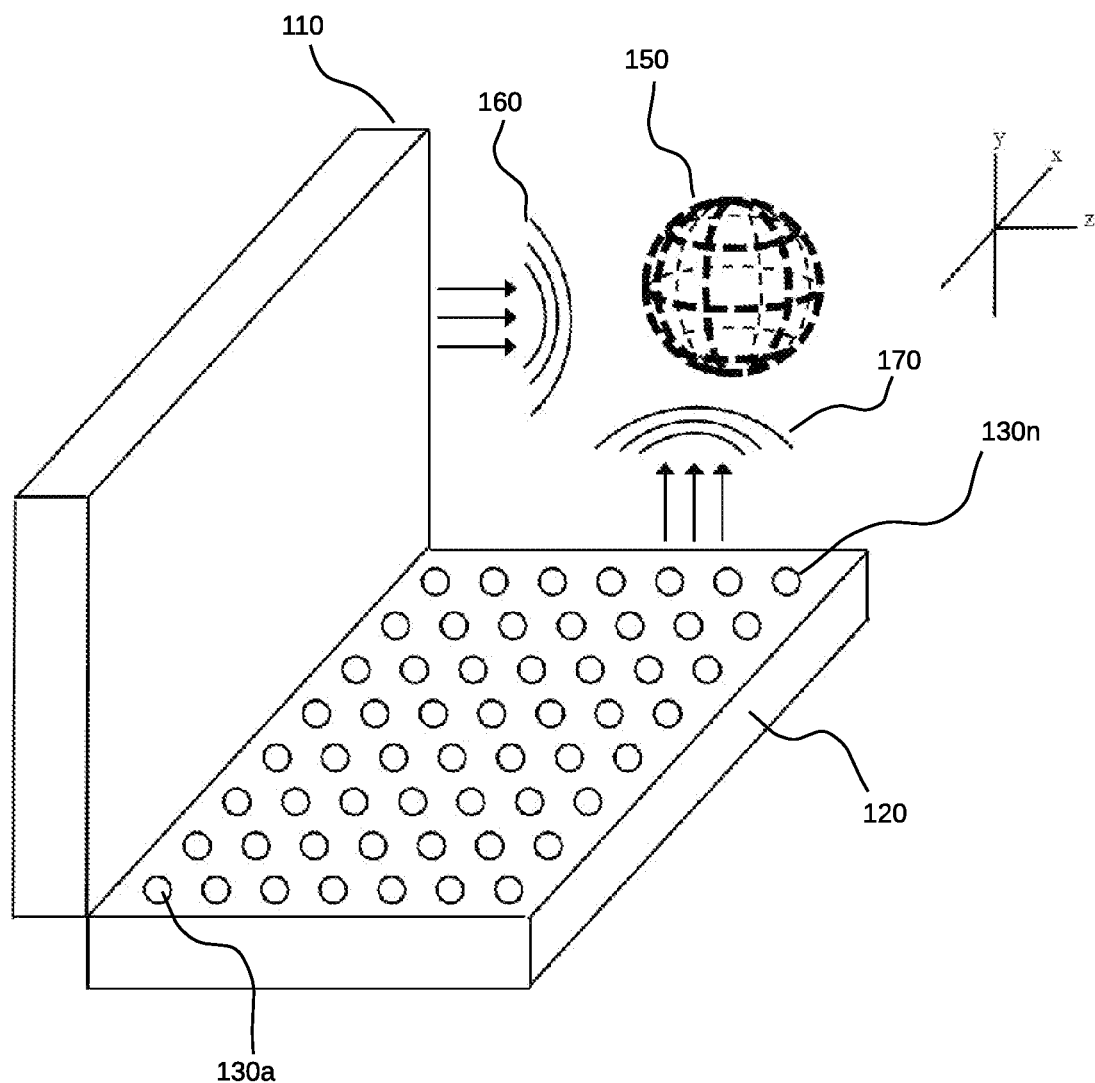
FIG. 1 illustrates an exemplary prior art solution for generating a multi-sense experience, wherein the plane containing the ultrasonic transducers is orthogonal to the 3-D display plane.
Figure 2:
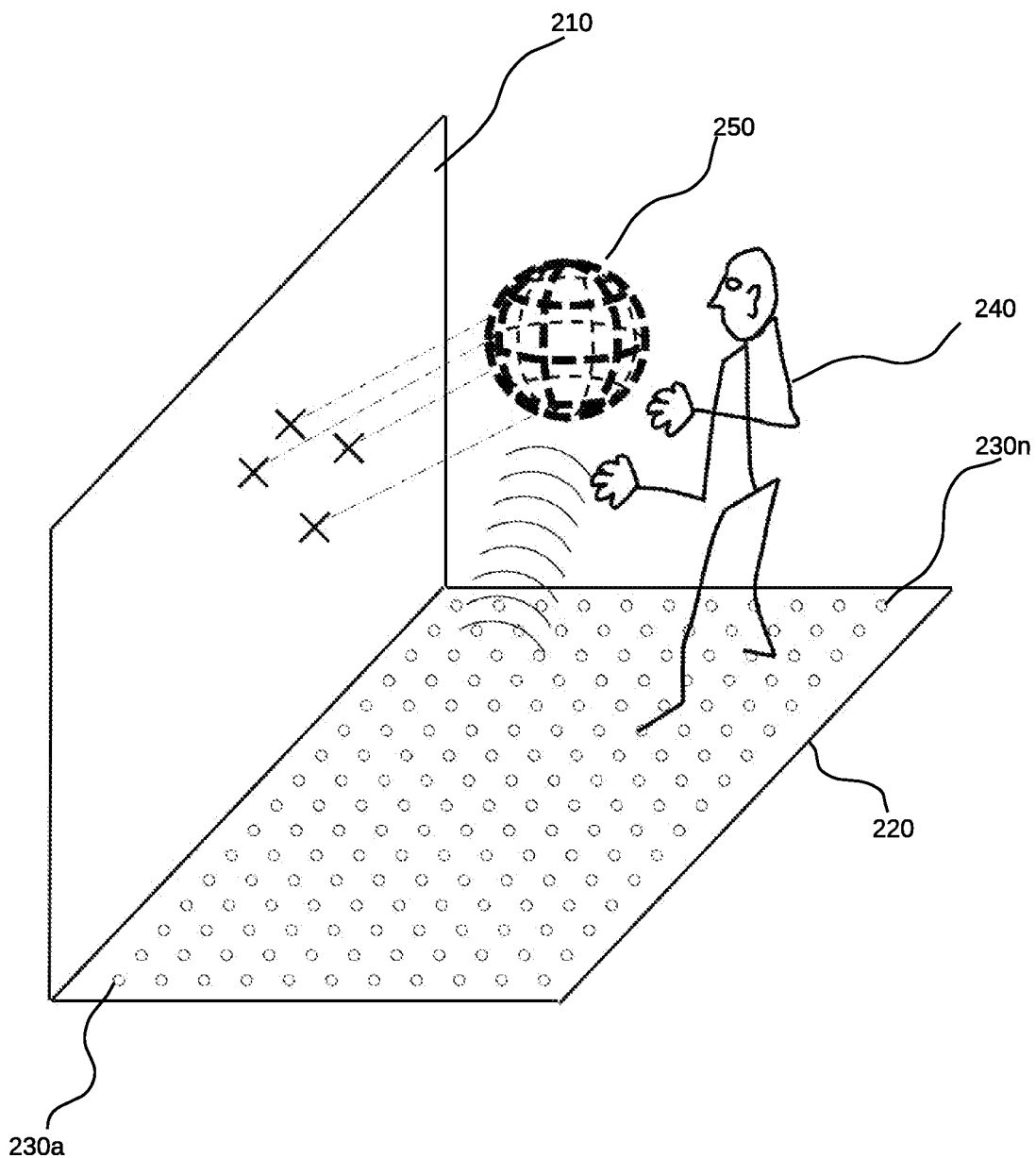
FIG. 2 illustrates an exemplary prior art solution for generating a multi-sense experience, wherein the plane containing the ultrasonic transducers is orthogonal to the 3-D display plane.
Figure 3:
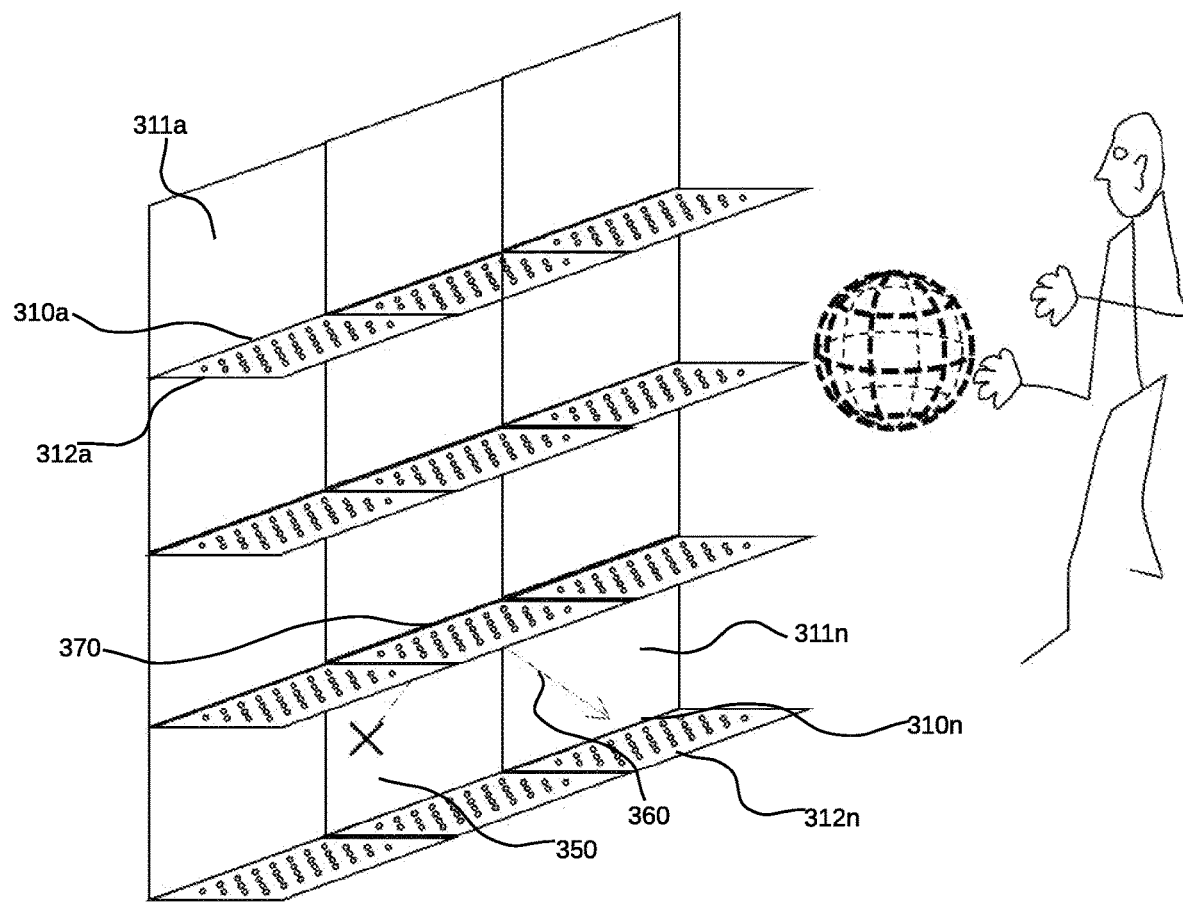
FIG. 3 illustrates scalability issues resulting from tiling an exemplary prior art solution for generating a multi-sense experience, wherein the plane containing the ultrasonic transducers is orthogonal to the 3-D display plane.
Figure 4:
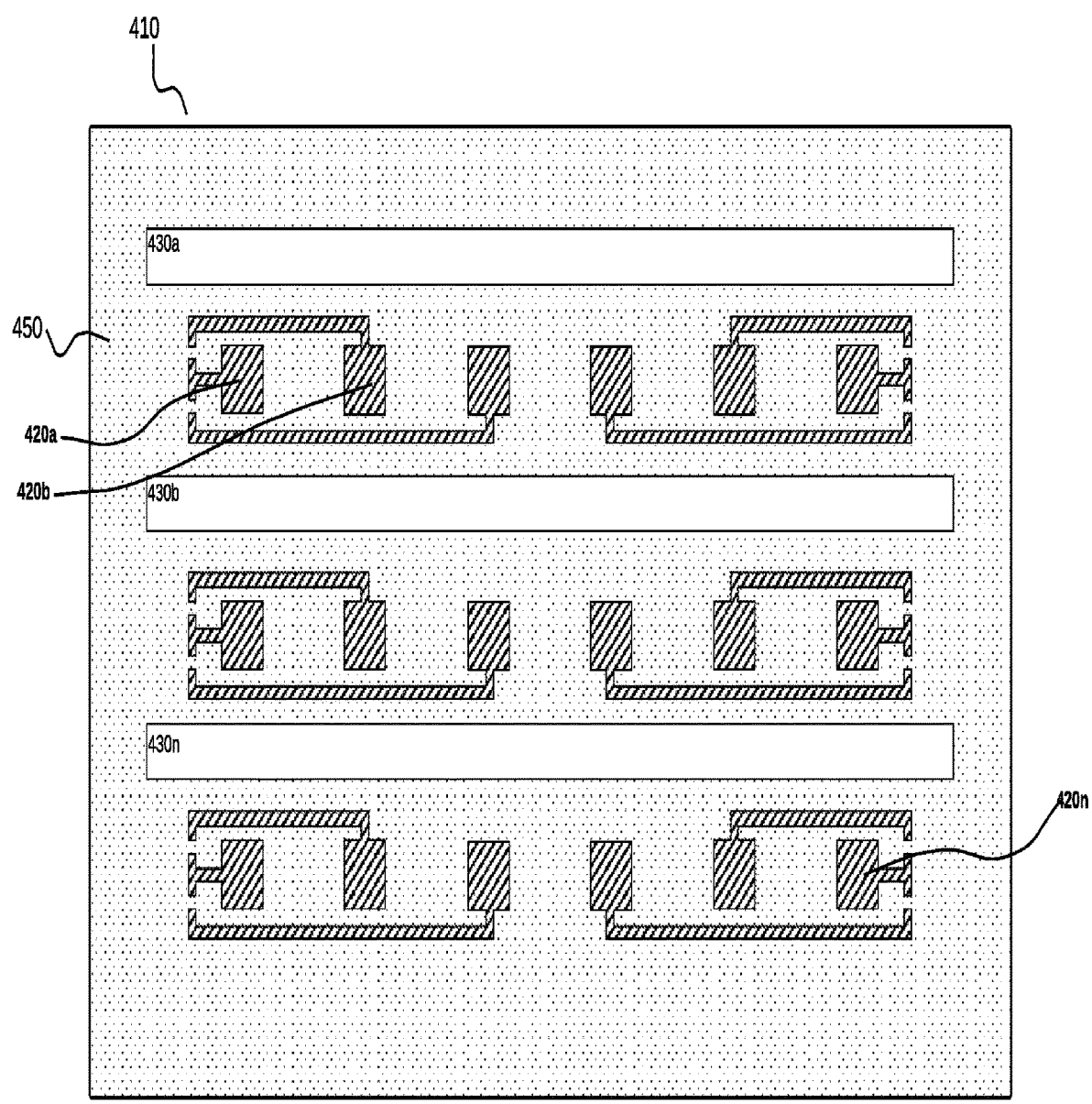
FIG. 4 illustrates an exemplary slit plane.

FIG. 4 illustrates an exemplary slit plane 410 that may be used in a preferred embodiment of this invention. Slit plane 410 may be made of multiple materials, including but not limited to copper-clad fiberglass or ceramic, aluminum including anodized aluminum, plastic, metal, wood, stone, glass, single crystal, polycrystalline or amorphous silicon or silicon nitride, single crystal or ceramic or other types of piezoelectric materials or piezo-metal sandwiches. Slit plane 410 may also be made from a combination of these or other materials. These materials may serve as substrates for both passive and active, electronic, optical, acoustic, and MEMs (microelectromechanical) devices.

In a preferred embodiment, slit plane 410 may be capable of supporting or integrating ultrasonic transducers 420a . . . n. The material may also support electronic busses, integrated optics, and MEMs devices antennas for driving the ultrasonic transducers. In a preferred embodiment slit plane surface 450 may absorb light. This may allow slit plane 410 to spatially filter noisy light from within, i.e., behind, slit plane 410 as well as reduce glare from room light or sunlight outside, i.e., in front of slit plane 410. The material may be used to provide acoustic impedance matching and an optimal material may also have an acoustic absorbing material on the back side. Exemplary light-absorbing materials may include, but are not limited to, black paint, lacquer, plastic, metals such as aluminum and steel anodized with dark dyes. Slit plane 410 may also absorb sound or acoustic energy. Acoustic absorbers may include, but are not limited to, resins, polymers, meshes, foams, and other known acoustic absorbing materials. Slit plane 410 may be of uniform thickness, or may be of varying thickness, or may be of varying sizes. In a preferred embodiment, slit plane 410 may have width and height dimensions to match the dimensions of 3-D display 510.

In one embodiment, slit plane 410 may be transparent or semi-transparent. Slits 430a . . . n may be made of transparent material which may have transparent conductors on the surface made of transparent conductive material such as Indium Tin Oxide (ITO). Ultrasonic transducers 420a . . . n may be made of optically transparent plastic membrane and transparent electrodes. By utilizing transparent materials the active, light illuminating regions can be maximized. A fully transparent slit plane would not impede light at all and would obviate the need for lenslet array layer 520. The front layer (formally, the slit layer) would just serve as the substrate layer for ultrasonic transducers and traces. If transparent materials are used for the display backplane, the whole display could be made to be transparent.

Slits 430a . . . n are disposed in slit plane 410 so that the light 550a . . . n from 3-D display 510 passes through slits 430a . . . n. In a preferred embodiment, slit plane 410 is designed to be placed directly on or in front of 3-D display 510, as illustrated in FIG. 5. In general, the number, location, orientation, size, and spacing of slits 430a . . . n depend on the particular characteristics of 3-D display 510. In one exemplary embodiment, 3-D display 510 may emit light 550a . . . n that is focused vertically through slits 430a . . . n, leaving the 3-D horizontal information unaffected. In some embodiments, vertical 3-D information may also be included as long as it can pass through slit 430n. In these embodiments, the slit shape and dimensions may be modified as necessary to accommodate vertical 3-D information. The light emitted from the 3-D display, which passes through slits 430a . . . n, enters in through the sides of the slit in a manner that minimizes the need for beveling the sides of the slit. In this embodiment, the number and density of slits 430a . . . n may be as low as two per display and as many as one per hogel ("holographic element"). The positioning of slits 430a . . . n on slit plane 510 is arbitrary. In one embodiment, slits 430a . . . n may be uniformly distributed across the area of slit plane 410. Although positioning of slits 430*a* . . . *n* is arbitrary, some factors may guide or affect slit positions in various applications. For example, ability to control sound increases as the density of slits 430*a* . . . *n* increases. Also, if the slits are placed a half wavelength apart (wavelength of the ultrasound) then the acoustic field can be controlled at any viewing angle.

Slit plane 410 may also serve as a spatial filter by blocking scattered light directed at areas on slit plane 410 other than slits 430*a* . . . *n*, thereby increasing signal-to-noise ratio and reducing glare. Scattered light may be blocked on the inner side of slit plane 410, i.e., the side facing 3-D display 510. Room light may be absorbed, thereby reducing glare, by the outer side of slit plane 410, i.e., the side away from 3-D display 510.

Slit dimensions, i.e., height and width, are generally arbitrary depending on the needs or characteristics of a particular application. If the length of slit 430*n* (i.e., the longer dimension) is shorter than half the wavelength of the illumination light of 3-D display 510, significant scattering could result. Such scattering could, in some applications, actually be a feature, as it may increase the vertical view angle for HPO displays. Slits 430*a* . . . *n* could be shaped other than as a rectangle, including but not limited to circles or annuli. A person of ordinary sill will be familiar with the characteristics, benefits, detriments, and various applications, that are associated with various slit shapes.

Slit dimensions may be subject to or limited by needs for transducer wiring and mounting requirements. In general, as the dimensions of a slit 430*n* increase, the ability of slit plane 510 to act as a filter may decrease. In a preferred embodiment, the width of slit 430*n* may be roughly equal to the circle-of-least-confusion or width of the point-spread function of lenslet array 520, i.e., slit 430*n* may be as wide as the smallest width of the focused point.

In one embodiment, slit plane 410 is oriented as shown in FIGS. 4 and 5, and slits 430*a* . . . *n* may be oriented horizontally, i.e., with the long edge parallel to the ground or the bottom of slit plane 410. In general, horizontal orientation of slits 430*a* . . . *n* may provide imagery for viewing along the horizontal axis. Horizontal orientation of slits 430*a* . . . *n* does not prevent vertical parallax. Slits 430*a* . . . *n* may be all oriented horizontally, or may be all oriented vertically, or may be a combination of horizontally and vertically oriented slits. Different orientations of slits 430*a* . . . *n* may provide imagery for viewing along different axes, which may be a desirable or useful feature for some applications. Slits 430*a* . . . *n* could also be oriented other than purely horizontally or vertically, e.g., vertically or at other angles, depending on particular circumstances or applications.

In some embodiments, slit plane 410 could be oriented such that the face of slit plane 410, i.e., the plane with slits 430*a* . . . *n*, is horizontal relative to the floor, e.g., oriented like the surface of a table top. The aspects of this invention apply to such an orientation, or to any other orientation.

A person of ordinary skill will recognize that the number, location, orientation, size, spacing, and any other characteristics of slits 430*a* . . . *n* may change, but that slits 430*a* . . . *n* are sized, positioned, and oriented in slit plane 410 so that the light 550*a* . . . *n* from 3-D display 510 passes through slit plane 410 unhindered, or substantially unhindered, and 3-D display 410 continues to substantially function. For example, in some applications using different 3-D displays, slits 430*a* . . . *n* may be oriented vertically, horizontally, diagonally, or in some combination of vertical, horizontal, and diagonal. The number, location, orientation, size, and spacing of slits 430*a* . . . *n* depends, in general, on the characteristics of 3-D display 510.

The shape of one or more of slits 430*a* . . . *n* may vary depending on the properties or characteristics of 3-D display 510. For example, in one embodiment, to accommodate a particular 3-D display 510, one or more of slits 430*a* . . . *n* may be in the shape of a cross. Other shapes are possible depending on the properties or characteristics of 3-D display 510.

In a preferred embodiment, slit plane 410 is monolithic.

Also, in one embodiment, the walls of one or more slits 430*a* . . . *n* may be angled. The "wall" of slit 430*n* is the sides of the slit as slit 430*n* extends through slit plane 410. For example, to accommodate light from 3-D display 510, the wall of slit 430*n* a slit may be angled so that a dimension of a slit increases or decreases moving from the back, i.e., the side facing 3-D display 510 to the front, i.e., the side away from 3-D display 510, of slit 430*n*, or vice versa, or in any other manner to accommodate light from 3-D display 510.

Ultrasonic transducers 420*a* . . . *n* are well-known in the art. In general, an ultrasonic transducer is a device that converts ultrasound waves to electrical signals or vice versa. As is known in the art, ultrasonic transducers may be used, among other things, to generate a tactile field or to generate directed audio. For example, see U.S. patent application Ser. No. 14/149,518 ("Method and apparatus for providing tactile sensations"), U.S. Patent Publication 2015/0192995 ("Method and apparatus for providing tactile sensations"), and WO2016007920A1 (PCT/US2015/040045, "Three dimensional tactile feedback system") for details on using ultrasonic transducers to generate a tactile field. See also, Watanabe, Toshio, and Shigehisa Fukui, "A method for controlling tactile sensation of surface roughness using ultrasonic vibration." *Robotics and Automation*, 1995, *Proceedings.*, 1995 IEEE International Conference on, Vol. 1. IEEE, 1995; Hoshi, Takayuki, et al. "Noncontact tactile display based on radiation pressure of airborne ultrasound." *Haptics, IEEE Transactions on*, Vol. 3, No. 3 (2010): 155-165.

Applying ultrasonic transducers to generate directed audio is also well-known in the art. See, for example, U.S. Pat. No. 8,369,546 to Pompei ("Ultrasonic Transducer for Parametric Array"); EP0973152 (Appl. 19990305632 19990715) to Pompei, ("Parametric audio system"); and U.S. Patent Publication No. 20160014529 ("Transparent Parametric Emitter"). These documents are incorporated herein by reference.

FIG. 5 shows an exploded view 500 of 3-D display 510 and slit plane 410, as combined in a preferred embodiment of this invention. FIG. 5 also shows lenslet array 520, which may be placed between 3-D display 510 and slit plane 410. In one embodiment, lenslet layer 520 focuses the light from 3-D display 510 vertically through slit plane 410. Ultrasonic transducers 420*a* . . . *n* may be attached, adhered, connected, or otherwise secured to, or included or manufactured as a part of, front of slit plane 410. As shown in FIGS. 4 and 5, the front (i.e., outside) of slit plane 410 is the side of the slit plane opposite, i.e., away from, 3-D display 510. The "back" or "inside" of slit plane 410 is the side opposite the "front" or "outside." The terms "front," "outside," "back," and "inside" have no significance other than for convenience in identifying a side of slit plane 410 for the description herein.

In a preferred embodiment, transducers 420*a* . . . *n* may be uniformly sized, and the size of a single transducer may be approximately 00 µm to 10 mm. Transducers of other sizes, shapes, and dimensions are well-known in the art. In general, the size and dimensions of a transducer 420*n* for securing to slit plane 410 may depend on power consumption characteristics of the transducer, efficiency of the transducer, power availability to the transducer(s), available space and dimensions of available space on slit plane 410, and means for securing the transducer(s) to slit plane 410. Many types of transducers are well known in the art, and may be used in this invention with necessary and well-known adaptation. Transducer types include, but are not limited to, CMUTs, piezo stacks, electrostatic, membrane, magnetostrictive, flexural, resonant cavity, and others.

The density of transducers $420a \ldots n$ on slit plane 410 may range from as many as one transducer for every hogel down to as few as one transducer per panel. In a preferred embodiment, a rectangular slit plane 410 with a 1 meter diagonal may have 600×600 hogels and 600×600 ultrasonic transducers. The density of transducers $420a \ldots n$ on slit plane 410 may be determined based on desired audio power, connectivity complexity, desired resolution of ultrasound steering and shaping, or other factors known in the art.

In a preferred embodiment, ultrasonic transducers $420a \ldots n$ may be integrated directly onto slit plane 410 using integrated ultrasonic transducers. Ultrasonic transducers $420a \ldots n$ may alternatively be secured to the slit plane by soldering or epoxy. The particular means for securing a transducer $420n$ to slit plane 410 may depend at least on the material from which slit plan 410 is made, size of transducers, and density of transducers.

The available surface area of slit plane 410, i.e., the area other than where slits $430a \ldots n$ are located, is the area where transducers $420a \ldots n$ may be located. For example, a transducer $420n$ placed directly over, in whole or in part, any part of a slit $430n$ through which light $550n$ from 3-D display 510 passes may block light for 3-D display 510 and may thereby affect the functionality of 3-D display 510. In some embodiments, because light $550n$ from 3-D display 510 may pass through a slit at an angle, a transducer $420n$ that protrudes from slit plane 410, which is located near a slit $430n$, may obstruct light $550n$ from 3-D display 510 as the light exits the slit $430n$, and may thereby affect the functionality of the 3-D display.

In addition to fitting transducers $420a \ldots n$ into the available surface area on slit plane 410, transducers $420a \ldots n$ may also be subject to minimum distances between each transducer. In one embodiment, transducers $420a \ldots n$ may be separated by half the ultrasonic wavelength or less. This maximum separation may facilitate 180 degree acoustic operation. Other embodiments may use longer separation distances between transducers, although this may result in less than 180 degree acoustic operation. In general, the angle of possible acoustic operation may decrease as the separation distance between the transducers increases.

In another embodiment, transducers $420a \ldots n$ may be manufactured into slit plane 410. For example the front surface of slit plane 410 could be a material such as, or similar to, a piezo stack which could be etched and patterned to create an array of ultrasonic transducers. Another embodiment may include the formation of membranes on the front surface of slit plane 410 surface, such as metallic membranes formed on KOH back-etched aluminum actuated electrostatically. Other embodiments may include, but are not limited to, flexural structures, resonant cavities, and magnetostrictive structures.

Transducers $420a \ldots n$ must be powered and controlled. In a preferred embodiment, transducers $420a \ldots n$ are powered by wires, antennae, or optical means.

Transducers $420a \ldots n$ may be and controlled by a processor, microprocessor, microchip, or any other device or system capable of sending varied electrical signals to a transducer. For example, in a preferred embodiment, a transducer $420n$ may be controlled by a driving computer, or one or more audio boards synced with one or more video cards, or other means.

In an alternate embodiment, instead of being positioned on the slit plane, the transducers may be positioned on a third layer with an additional set of lenses. These lenses could be positive or negative and could increase the optical fill factor, reducing the appearance of black areas in the display, and/or allowing for further adjustment of optical scan angle in the vertical direction. By having a third plane with a set of lenslets it may be possible to have the lenslets themselves be part of an ultrasonic transducer. For example, the concave surface of a negative lenslet could be covered with a transparent conductor. A transparent, conductive membrane could be placed over this concavity to create an ultrasonic transducer. The connective traces could be located on the slit plane. In such a configuration, the layer visible to the viewer would be mostly luminous and transparent (rather than mostly opaque like the slit plane may be in some embodiments) and would allow the ultrasonic field and 3-D imagery to be fully superimposed as they are emitted from the same point on the plane. The second set of lenses would allow the first set to be made with long focal lengths, which could simplify fabrication.

Figure 8:
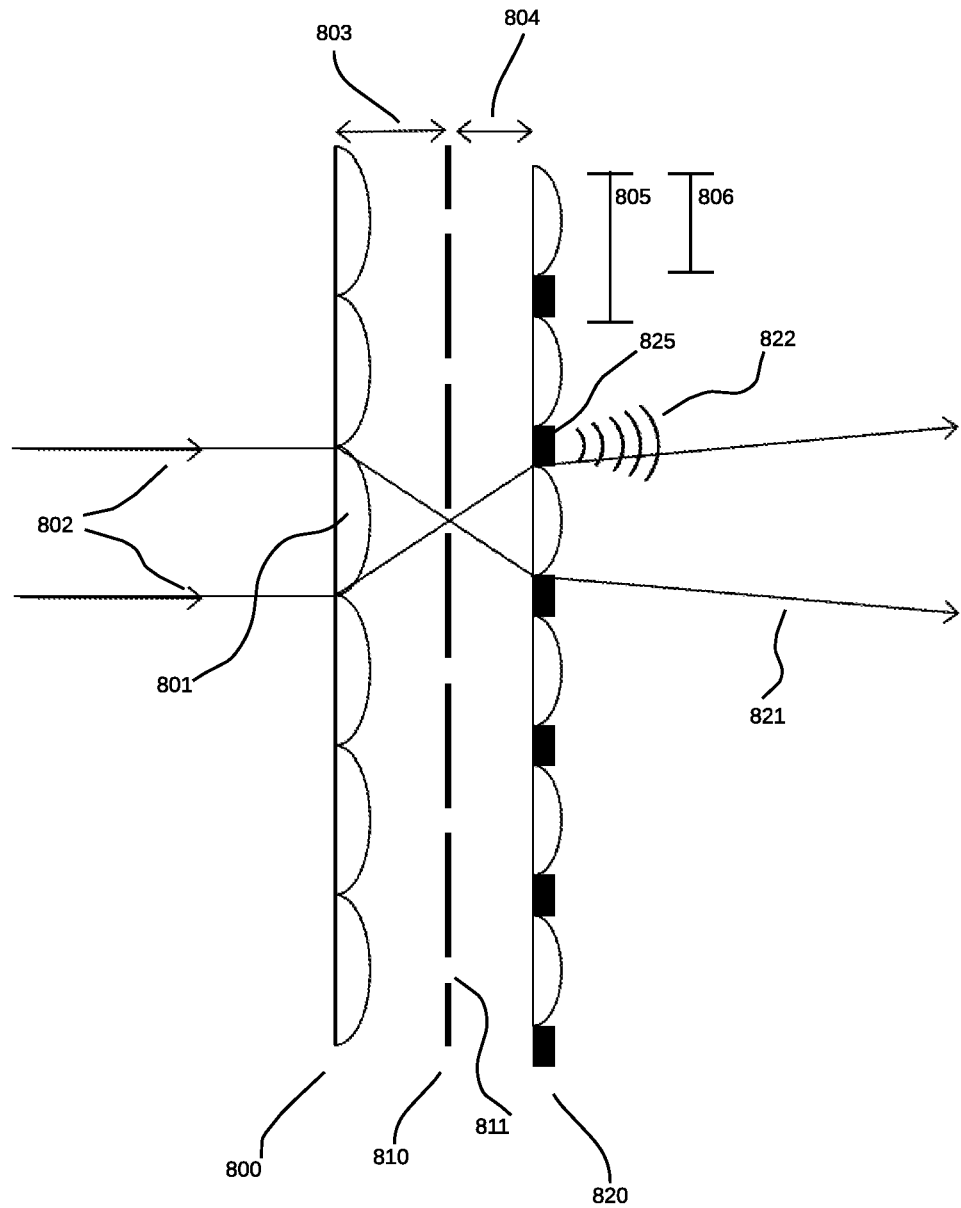
FIG. 8 illustrates an alternate embodiment of this invention that uses a lenslet array with ultrasonic transducers.
Figure 9:
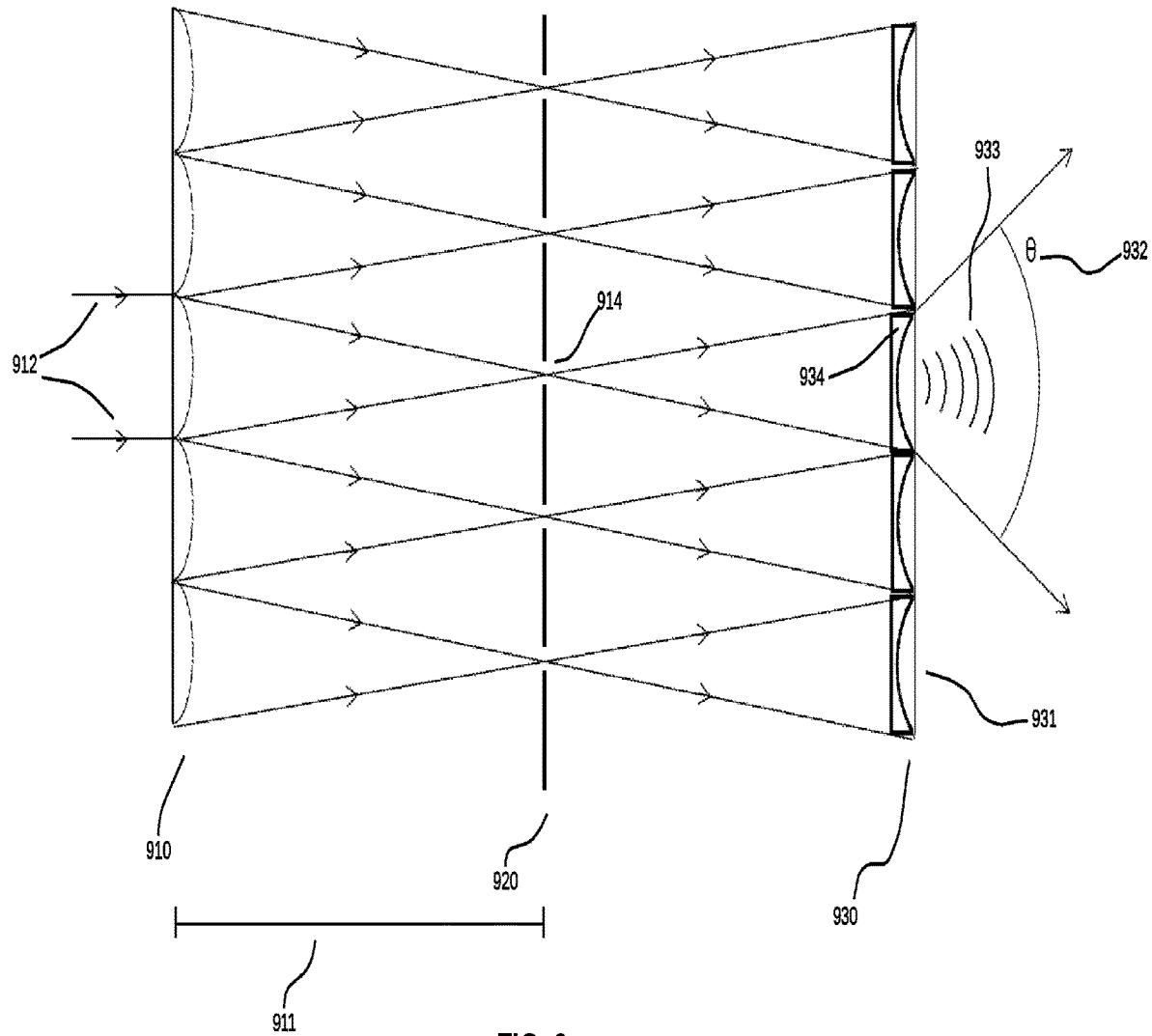
FIG. 9 illustrates further illustrates the alternate embodiment of this invention that uses a lenslet array with ultrasonic transducers.

FIGS. 8 and 9 illustrate this alternate embodiment. FIG. 8 illustrates lenslet array 800, slit plane 810, and a third plane 820 with a lenslet array and ultrasonic transducers. Lenslet 801 focuses input light 802, which is from the 3-D display. Light focused by lenslet 801 then goes through slit 811 in slit plane 810. Item 803 shows the focal distance of the back of lenslet array. Item 804 shows the focal distance on the front of the lenslet array. Distance 805 divided by distance 806 is the fill ratio. Directed acoustic field 822 emanates from transducer 825 on third plane 820.

FIG. 9 illustrates lenslet/lenticular plane 910, slit plane 920, and negative lenslet array 930 with transparent ultrasonic membrane 931. Light 912 from 3-D display travels through lenslet/lenticular plane 910, through slit 914 in slit plane 920, and is then modified at lenslet 934. Item 933 shows an ultrasonic wave field from a transducer in lenslet array 930. Item 932 shows the modified light angle resulting from lenslet array 930.

3-D display 510 may be secured to slit plane 410 in many ways known in the art, including but not limited to adhesive, epoxy, air pressure, soldering, or other methods or combinations of methods.

Figure 6:
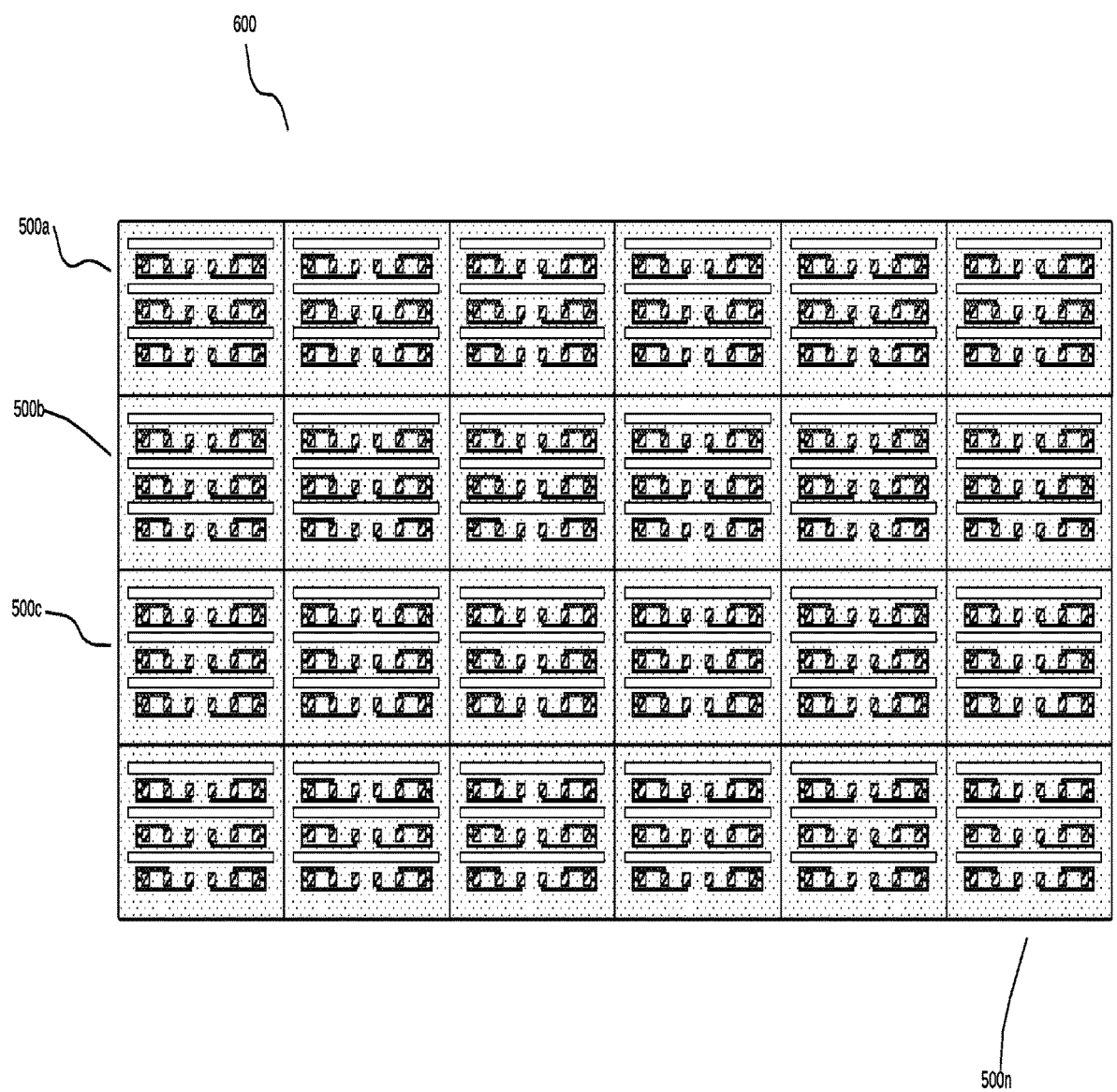
FIG. 6 illustrates an exemplary tiling application of this invention.

Because slit plane 410 and ultrasonic transducers $420a \ldots n$ in slit plane unit 500 are coplanar, e.g., as illustrated in FIGS. 4 and 5, slit plane units may be tiled to create a larger co-planar surface 600 as shown in FIG. 6. Tiled surface 600 comprises, generally, multiple slit plane units $500a \ldots n$. Tiled slit plane units $500a \ldots n$ may be secured by mounting tiled slit plane units $500a \ldots n$ onto a common structure such as a wall or other mounting structure. The 3-D displays and sets of ultrasonic transducers respectively associated with each of tiled slit plane units $500a \ldots n$ may be driven by any driver technologies or approaches known in the art, such as computers, or parallel networking, or hardware, or in any other manner as known in the art.

Figure 7:
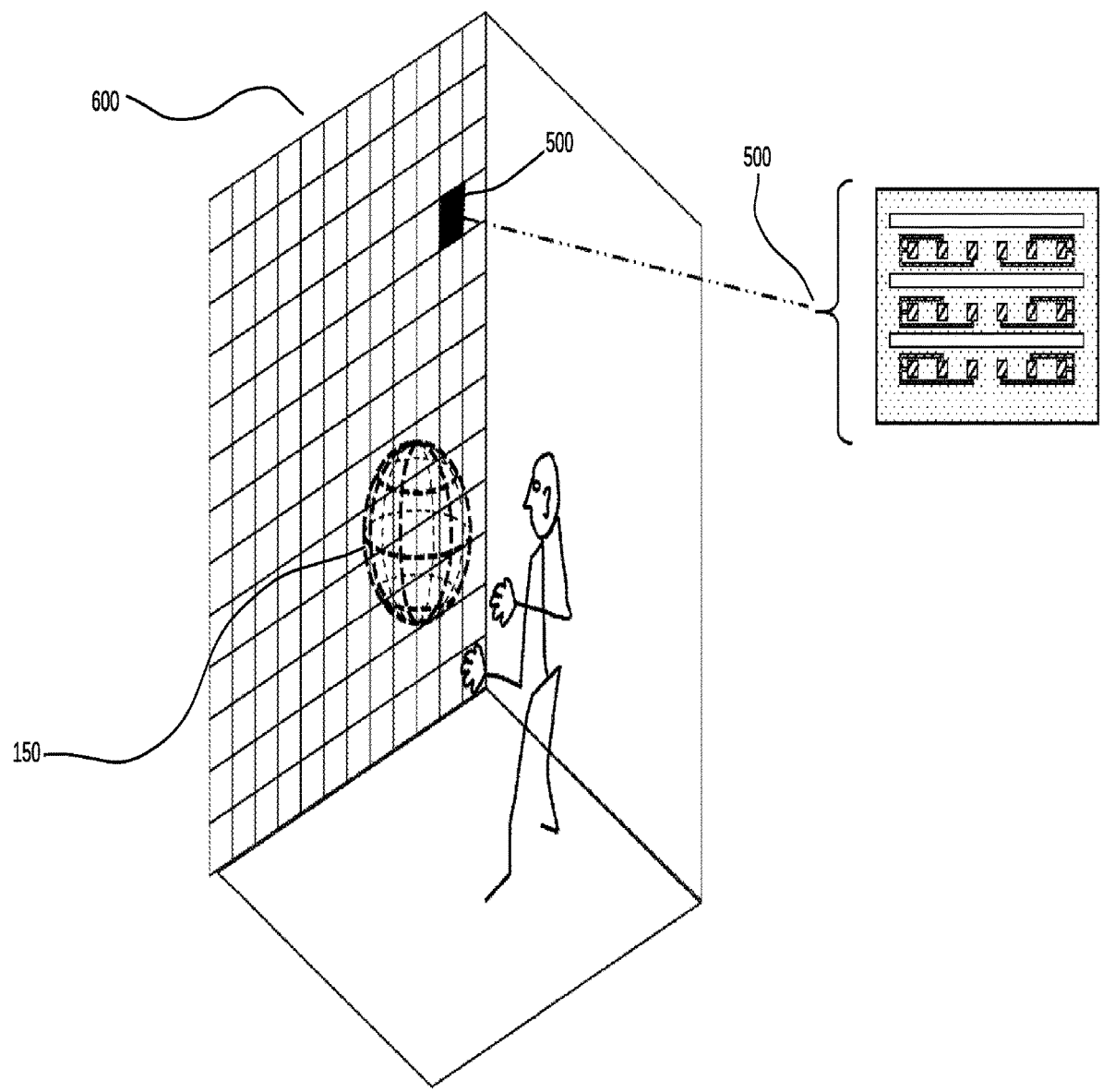
FIG. 7 illustrates an additional exemplary tiling application of this invention.

FIG. 7 illustrates one embodiment of a tiled surface 600 in a room. The individual units of tiled wall 600 are each a slit plane unit 500, which have been tiled to cover some or all of a wall, and may be used on conjunction with one another to generate object 150, which may be a 3-D virtual object having acoustic and/or tactile properties as generated by the ultrasonic transducers on the slit plane units comprising tiled wall 600.

The following descriptions of three specific embodiments present three exemplary embodiments in great detail. Although a person of ordinary skill would not need such details to implement or practice the invention described herein, these descriptions of three specific exemplary embodiments are provided merely as examples of how this invention might be practiced or implemented.

In a first specific detailed embodiment, a tileable unit is comprised of a holographic video display plane, a lenticular plane and a slit plane. The holographic plane is fabricated from a 1 mm thick double-side-polished, x-cut lithium niobate wafer. The wafer is treated to possess surface waveguides. The waveguides are 800 microns wide and 48 mm long with interruptions of 1 mm every 1 mm for a 50/50 waveguide duty cycle. These waveguides are formed by proton exchange in pure benzoic acid using an aluminum mask and the waveguide extends to a depth of 0.5 microns after proton exchange. The waveguides are then annealed for 45 minutes at 375° C. Along each horizontal line defined by the intermittent waveguide, there is a column of three interdigital transducers, each corresponding to one vertical view. These transducers are patterned from the aluminum remaining from the proton exchange mask, which is then patterned to create aluminum transducers with a film thickness of 200 nm, and a transducer width of 190 microns and length of 800 microns, with a frequency chirp corresponding to a range from 300 to 600 MHz with transducer finger widths running from 2.4 to 1.6 microns.

At the other end of the proton exchange region, just before the next set of transducers, is an input coupling grating, 800 μm wide and 200 microns long etched to a depth of 150 nm into the lithium niobate. Red, green, and blue laser light (633 nm, 532 nm, and 45 nm) of TE polarization is introduced into the polished side of the polished side of the device. The device is polished at an angle of 26.565 degrees from the substrate normal. The laser light is made to enter the polished face perpendicularly to the normal so that all colors travel collinearly within the substrate and bounce on the transducer/waveguide side of the substrate at a period of 2 mm. The bounces are made to occur centered on the grating input couplers coupling light into the waveguide. RF is applied to the transducers diffracting light from the waveguide into the substrate and falling toward the bottom surface. The bottom surface is etched with a pattern of high-aspect-ratio cones (10:1 length:width) which serve as an adiabatic index shift to eliminate fresnel reflection. This pattern is modulated with a ramp at a larger spatially frequency to direct the light normally out of the bottom of the device.

The exiting light then encounters the lenticular plane. The lenticular plane is centered on the waveguide regions from the holographic video plane. The lenticular is made to have a focal length of 1 mm (in lithium niobate) and is fabricated on the bottom surface of the lithium niobate wafer. The power of the lenticular array is in the horizontal direction. The pitch of the lenticular is 1 mm. The dimensions of the lenticular are 50 mm by 50 mm. The lenticular is formed by direct-write grayscale lithography in grayscale resist. The light diffracted by the transducers is collimated in the lithium niobate substrate and then focused by the lenticular through the horizontal slit plane.

The horizontal slit plane is located 1 mm from the lenticular plane and the slit is centered on the lenticular. Each slit is 100 μm width and 1 mm length and there is one slit centered above every waveguide region. The slit is composed of a sandwich of one layer of nickel, then PZT, and then another layer of nickel. The outside nickel layers are etched to form capacitive structures which serve as ultrasonic transducers. These transducers are 900×900 microns and are separated by 2 mm, staggered between the slits so as to form a regular pattern. The smaller, thinner channels are etched to form channels which carry ultrasonic drive signal to the transducers. The nickel on the other side of these traces is removed to prevent the creation of more capacitors. The nickel faces are covered on the front by india ink to provide light absorption and, on the back, by charred photoresist which serves both to absorb light and to dampen sound. The ultrasonic transducers are driven with a carrier frequency at 40 kHz. This carrier is then amplitude modulated at lower frequencies (e.g., below 200 Hz) for tactile fields and at higher frequencies (e.g., above 200 Hz) for audio fields.

The light exiting the slit forms holographic images with full parallax and mingles with the ultrasonic wavefronts which serve to create directed parametric audio and tactile fields. The mingling of the sonic and optical fields creates the three-sense experience.

In a second specific detailed embodiment, a three-sense display unit is created from a high-resolution liquid crystal display followed by a positive lenslet array plane, an aperture plane, and finally a negative lenslet array with active membranes.

The 3-D display layer is created by placing a 400×250 mm positive lenslet with 2 mm pitch in front of a 32 inch diagonal 4 k display (3840×2160 pixels). The lenslet is a 400×250 lenslet array. The lenslet is registered to a 8×10 pixel group which defines the number of addressable views. The lenslet is separated from the display by three focal lengths. Pixels from the display are then demagnified and imaged just beyond the front focal length of the lenslet. This image forms the image plane. The aperture plane, which is the slit plane with a square or circular aperture instead of a long rectangular slit, is placed at the image plane. The size of the aperture is a circular aperture with 1 mm radius. The aperture plane contains traces for ultrasonic signals. The third layer is a negative lenslet array with the back focal length at the image plane. The negative lenslet array is covered with indium tin oxide (ITO) on the front side and connected through vias to the aperture plane traces. A buffer layer of epoxy is used to adhere a thin plastic membrane 5-10 microns thick over the top of the negative lenslet array affixed by epoxy. The membrane is also covered with indium tin oxide. The membrane is attracted and repelled by the interior of the negative lens, thereby forming an ultrasonic transducer. The light waves and ultrasonic waves combine in the far field to create a three-sense experience.

In a third specific detailed embodiment, a three-sense display unit is created from a high resolution display with a high enough frame rate to allow for use with shutter glasses such as 120 Hz (this embodiment has eyeglasses as an encumbrance). A liquid crystal display is followed by a transparent slit plane (where the slit is the entirety of the display). The transparent slit plane has transparent ITO traces on the side facing the high resolution display. The other side has electrodes on a 3 mm grid surrounded by polyimide or SU8 walls with a plastic membrane stretched and affixed over the walls to form a cavity. The top membrane is made conductive with an ITO layer forming an array of ultrasonic transducers. The visual field and ultrasonic field interact in front of the display to effect a three-sense experience.

The foregoing disclosure is presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention.

The illustrations and descriptions of the invention herein have been simplified as appropriate to focus on elements essential to clearly understand the invention. Other elements may be desirable and/or required in order to implement the invention. However, because such elements are well known and do not facilitate a better understanding of the invention, a detailed discussion of such elements is not provided herein.

What is claimed is:

1. A haptics device, comprising:
   a substrate operable to receive and direct light therethrough to form a hologram in a holographic volume, the substrate comprising:
      one or more transmissive areas configured to transmit the light towards the holographic volume; and
      one or more non-transmissive areas operable to direct mechanical energy to the holographic volume; and
   wherein the substrate comprises a plurality of mechanical energy devices in the one or more non-transmissive areas, the plurality of mechanical energy devices being configured to perform a conversion between mechanical energy and electrical signals.

2. The haptics device of claim 1, wherein the plurality of mechanical energy devices are operable to direct the mechanical energy to form a tactile field in the holographic volume.

3. The haptics device of claim 2, wherein the plurality of mechanical energy devices comprises at least one transducer.

4. The haptics device of claim 3, wherein the at least one transducer comprises a capacitive micromachined ultrasonic transducer, a piezo transducer, an electrostatic transducer, a membrane, a magnetostrictive transducer, a flexural ultrasonic transducer, or a resonant cavity type mode transducer.

5. The haptics device of claim 1, further comprising an array of waveguides aligned with the one or more transmissive areas of the substrate and operable to direct light received by the substrate to the holographic volume to form the hologram.

6. The haptics device of claim 5, wherein the array of waveguides are disposed in the substrate.

7. The haptics device of claim 5, wherein the array of waveguides are spaced from the substrate.

8. The haptics device of claim 5, wherein the array of waveguides and the one or more non-transmissive areas of the substrate are disposed in an interleaving arrangement.

9. A haptics system comprising the haptics device of claim 1, further comprising a display apparatus operable to output light and an array of waveguides disposed between the display apparatus and the haptics device, the array of waveguides operable to direct light from the display apparatus through the one or more transmissive areas of the substrate to the holographic volume to form the hologram.

10. A haptics system comprising:
    a substantially transparent substrate operable to substantially transmit light therethrough; and
    a plurality of waveguides positioned to direct light through the substantially transparent substrate to a holographic volume to form a hologram;
    wherein the substantially transparent substrate is positioned to direct mechanical energy to the holographic volume and comprises a plurality of mechanical energy devices configured to perform a conversion between mechanical energy and electrical signals.

11. The haptics system of claim 10, wherein the plurality of mechanical energy devices are operable to direct the mechanical energy to form a tactile field in the holographic volume.

12. The haptics device of claim 11, wherein the plurality of mechanical energy devices comprises at least one transducer.

13. The haptics device of claim 12, wherein the at least one transducer comprises a capacitive micromachined ultrasonic transducer, a piezo transducer, an electrostatic transducer, a membrane, a magnetostrictive transducer, a flexural ultrasonic transducer, or a resonant cavity type mode transducer.

14. The haptics system of claim 10, wherein the plurality of mechanical energy devices comprises transparent membrane and transparent electrodes.

15. The haptics system of claim 10, wherein the substantially transparent substrate comprises a transparent material.

16. The haptics system of claim 10, further comprising a display apparatus operable to output light to the plurality of waveguides.

17. A haptics system comprising the haptics device of claim 10, further comprising a display apparatus operable to output light to the plurality of waveguides.

18. A haptics device comprising:
    a substrate comprising
       a plurality of waveguides; and
       a plurality of mechanical energy devices that are substantially transparent, the plurality of mechanical energy devices being disposed at least partially over of the plurality of waveguides;
    where in the plurality of waveguides are configured to receive light and direct the received light through the substantially transparent substrate to a holographic volume to form a hologram; and
    wherein the plurality of mechanical energy devices are configured to perform a conversion between mechanical energy and electrical signals and to direct mechanical energy to the holographic volume.

19. The haptics device of claim 18, wherein the plurality of mechanical energy devices comprises at least one transducer.

20. The haptics device of claim 19, wherein the at least one transducer comprises a capacitive micromachined ultrasonic transducer, a piezo transducer, an electrostatic transducer, a membrane, a magnetostrictive transducer, a flexural ultrasonic transducer, or a resonant cavity type mode transducer.

* * * * *